(12) United States Patent
Kawabata et al.

(10) Patent No.: US 9,706,068 B2
(45) Date of Patent: Jul. 11, 2017

(54) AUTOMATIC DOCUMENT FEEDER

(71) Applicant: SEIKO EPSON CORPORATION, Tokyo (JP)

(72) Inventors: Seiji Kawabata, Matsumoto (JP); Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/051,521

(22) Filed: Feb. 23, 2016

(65) Prior Publication Data

US 2016/0255211 A1 Sep. 1, 2016

(30) Foreign Application Priority Data

Feb. 27, 2015 (JP) ................. 2015-039255

(51) Int. Cl.
*H04N 1/00* (2006.01)
*B65H 5/06* (2006.01)
(Continued)

(52) U.S. Cl.
CPC ........... *H04N 1/0032* (2013.01); *B65H 5/062* (2013.01); *B65H 5/068* (2013.01); *B65H 5/38* (2013.01); *H04N 1/00543* (2013.01); *H04N 1/00795* (2013.01); *B65H 2402/441* (2013.01); *B65H 2402/64* (2013.01); *B65H 2404/144* (2013.01); *B65H 2404/1521* (2013.01); *B65H 2404/6111* (2013.01); *B65H 2801/03* (2013.01); *H04N 2201/0094* (2013.01)

(58) Field of Classification Search
CPC ............. H04N 1/0032; H04N 1/00543; H04N 1/00795; H04N 2201/0094; B65H 3/06; B65H 5/06; B65H 5/062; B65H 5/068; B65H 5/38; B65H 2801/03; B65H 2402/441; B65H 2402/64; B65H 2404/144; B65H 2404/1521; B65H 2404/6111
USPC ........................................................ 358/1.14
See application file for complete search history.

(56) References Cited

U.S. PATENT DOCUMENTS

2007/0246879 A1* 10/2007 Sagawa .................... B65H 3/06
271/12
2008/0085140 A1* 4/2008 Kajiyama .............. B65H 5/025
399/361

(Continued)

FOREIGN PATENT DOCUMENTS

JP 2004-268357 9/2004

*Primary Examiner* — Allen H Nguyen
(74) *Attorney, Agent, or Firm* — Workman Nydegger

(57) ABSTRACT

An upstream-side unit of a reading unit of an automatic document feeder has protruding portions that protrude toward a surface that forms a document feeding path in a mechanism body unit on both sides of a document in the width direction outside a feeding portion that forms the document feeding path. Positioning of the upstream-side unit provided so as to be rotatable with respect to the mechanism body unit is performed by making protruding portions come in contact with a guide surface of the mechanism body unit, the guide surface forming the document feeding path. By adopting this configuration, because the protruding portions provided on both sides of the document in the width direction outside the document feeding path are used to perform positioning, it is possible to increase the accuracy of clearance for allowing a document to pass through the document feeding path.

7 Claims, 12 Drawing Sheets

(51) Int. Cl.
  *B65H 3/06* (2006.01)
  *B65H 5/38* (2006.01)

(56) References Cited

U.S. PATENT DOCUMENTS

2008/0203649 A1* 8/2008 Watase .................... B65H 3/44
                                                           271/9.13
2010/0078881 A1* 4/2010 Osakabe .............. H04N 1/0057
                                                           271/241

* cited by examiner

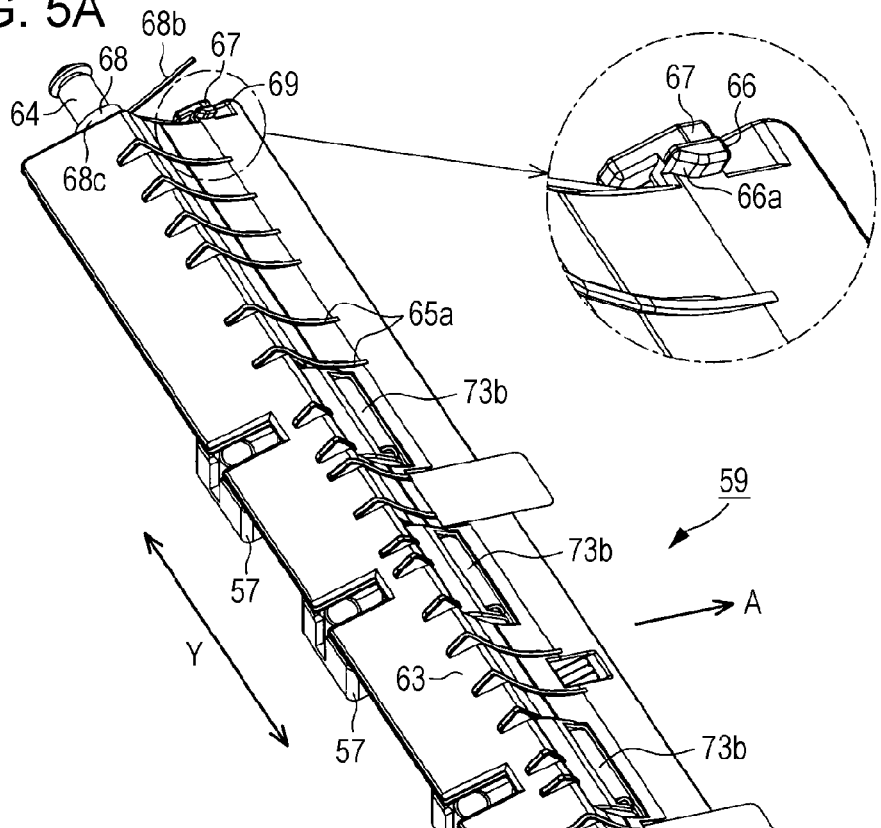
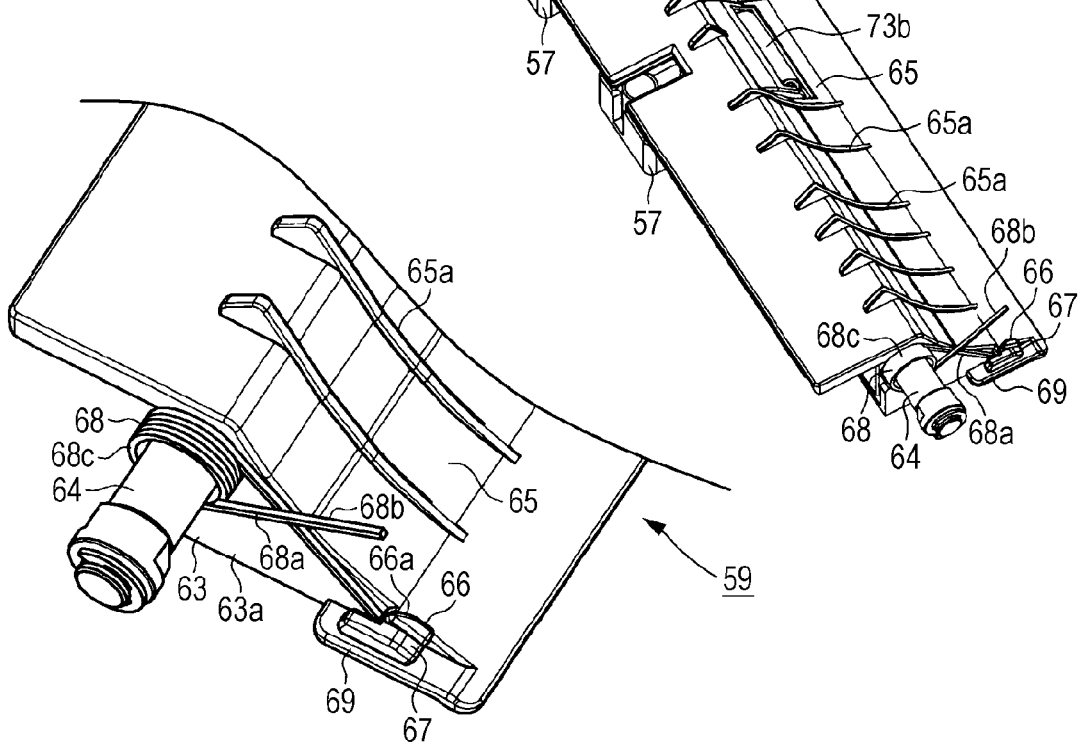
FIG. 5A
FIG. 5B

AUTOMATIC DOCUMENT FEEDER

BACKGROUND

1. Technical Field

The present invention relates to an automatic document feeder.

2. Related Art

In a recording device of JP-A-2004-268357 (FIG. 6, FIG. 10, paragraphs 0053 and 0054), recording is performed on a target recording medium fed from a supply tray inside a recording device by a recording unit inside the recording device, and the target recording medium on which recording has been carried out is fed along a paper feeding path in an upper portion of a device body unit to an ejection tray provided in the upper portion of the device body unit.

The paper feeding path is covered by an open/close lid of a two-body structure made up of a first cover portion arranged in the upper portion of the device body unit and a second cover portion arranged at a position corresponding to the first cover portion. The first cover portion is formed so as to obtain, by being freely rockable with respect to the device body unit about a rocking shaft, an open state in which the paper feeding path is exposed and a closed state in which the paper feeding path is covered.

A positioning surface is provided in the first cover portion and, when in the above-described closed state, the positioning surface is such that it surface-contacts an upper surface of a frame of the device body unit.

In a configuration similar to that described above, in a state in which the first cover portion is closed, a portion that performs positioning of the first cover portion, that is, the above-described positioning surface, is provided on the device body unit side and is a frame surface that is different from an inside portion guide member that forms the above-described paper feeding path.

Therefore, in the above-described paper feeding path, when adjusting clearance for allowing the covered recording medium to pass, because the frame surface is interposed between the inside portion guide member and the first cover portion, it becomes difficult to obtain accuracy of the target path.

In the case where such a configuration is applied to an automatic document feeder that has a document feeding path, in the document feeding path, in adjustment of the clearance, it becomes difficult to obtain accuracy of the target document feeding path.

SUMMARY

An advantage of some aspects of the invention is that an automatic document feeder that can increase the accuracy of clearance for allowing a document to pass through the document feeding path in the automatic document feeder is provided.

An automatic document feeder according to an aspect of the invention has a first unit that has a first surface that forms a document feeding path and that is provided so as to be movable, a second unit that has a second surface that together with the first surface forms the document feeding path, that is positioned in a moving direction of the first unit and that is capable of opposing the first surface, and protruding portions that are on one unit among the first unit and the second unit on both sides of a document in a width direction outside a feeding portion forming the document feeding path and that protrude toward a surface of the other unit, the surface forming the document feeding path, and wherein positioning of the first unit, which is movable, with respect to the second unit, is performed by making the protruding portions come in contact with the surface, which forms the document feeding path, of the other unit.

According to this aspect of the invention, because the protruding portions are positioned so as to be outside the document feeding path on both sides of the document in the width direction, it is possible to increase the accuracy of clearance for allowing a document to pass through the document feeding path.

In this case, it is preferable that the first unit have a pivot that rotates in a rotation direction that is a direction of the movement, the pivot be provided in one portion among an upstream-side portion and a downstream-side portion of the first unit in the feeding direction of the document feeding path, and the protruding portions be provided in the other portion among the upstream-side portion and the downstream-side portion of the first unit in the feeding direction of the document feeding path.

By doing this, because the protruding portions are positioned far away from the pivot, the accuracy of clearance for allowing a document to pass through the document feeding path is increased.

Moreover, in this case, it is preferable that the first unit have urging members that urge the first unit in the direction of the movement, the urging members each be a torsion spring, the torsion springs each have a winding portion that is wound around the pivot, the protruding portions be provided in the first unit, first locking portions that lock one end of each of the torsion springs be provided in the protruding portions and second locking portions that lock the other end of the torsion springs be provided in the second unit.

By doing this, when positioning the first unit with respect to the second unit by using the protruding portions, the accuracy of a clearance for allowing a document to pass through the document feeding path is increased because the first unit is urged toward the second unit by the urging members. Moreover, by doing this, it is possible to make the protruding portions reliably come in contact with the second unit because it is possible to obtain an urging force in a rotation direction by the torsion springs.

Moreover, in this case, it is preferable to provide the first locking portions and the protruding portions at positions that overlap in the width direction of the document.

By doing this, because the torsion springs and the protruding portions are not staggered in the width direction of the document, the document feeding path does not become deformed, and it is possible to increase the accuracy of clearance of the document feeding path.

Moreover, in this case, it is preferable to provide the first locking portions at positions that are adjacent to end portions of the first surface in the width direction.

By doing this, in the width direction of the document feeding path (that is, a document), the device may be made more compact and, because the protruding portions are provided, end portions of the urging members that are locked by the first locking portions may be prevented from coming off by the protruding portions.

Moreover, in this case, it is preferable that a side of each of the first locking portions that faces a document that passes the first surface have a shape that tapers toward the downstream side in the feeding direction and toward the inside of the feeding portion.

By doing this, when a document being fed through the document feeding path comes in contact with the protruding portions, the document is guided and fed smoothly in the feeding direction by the protruding portions.

Moreover, it is preferable that a cover member that covers the first locking portions be provided on the side of the first locking portions opposite to the first surface.

By doing this, because the side of the first locking portion opposite to the first surface is not exposed due to the cover member, the end portions of the urging members that are locked by the first locking portions cannot be touched by a worker and it is possible to perform maintenance work safely.

Moreover, it is preferable that a reading unit that reads a document be provided in the document feeding path and the first unit be provided on each of the upstream and downstream sides of the reading unit in the document feeding path.

By doing this, because it is possible to open the automatic document feeder even though a reading unit is provided it becomes easy to remove a document that has become jammed in the document feeding path.

BRIEF DESCRIPTION OF THE DRAWINGS

The invention will be described with reference to the accompanying drawings, wherein like numbers reference like elements.

FIG. 5A is a perspective diagram of an upstream-side unit that serves as a first unit.

FIG. 5B is an enlarged perspective diagram of a shaft portion of the upstream-side unit.

DESCRIPTION OF EXEMPLARY
EMBODIMENTS

Below, an example of an automatic document feeder of the invention installed in a multi-function machine as a first embodiment will be described with reference to FIGS. 1 to 12.

Figure 1:
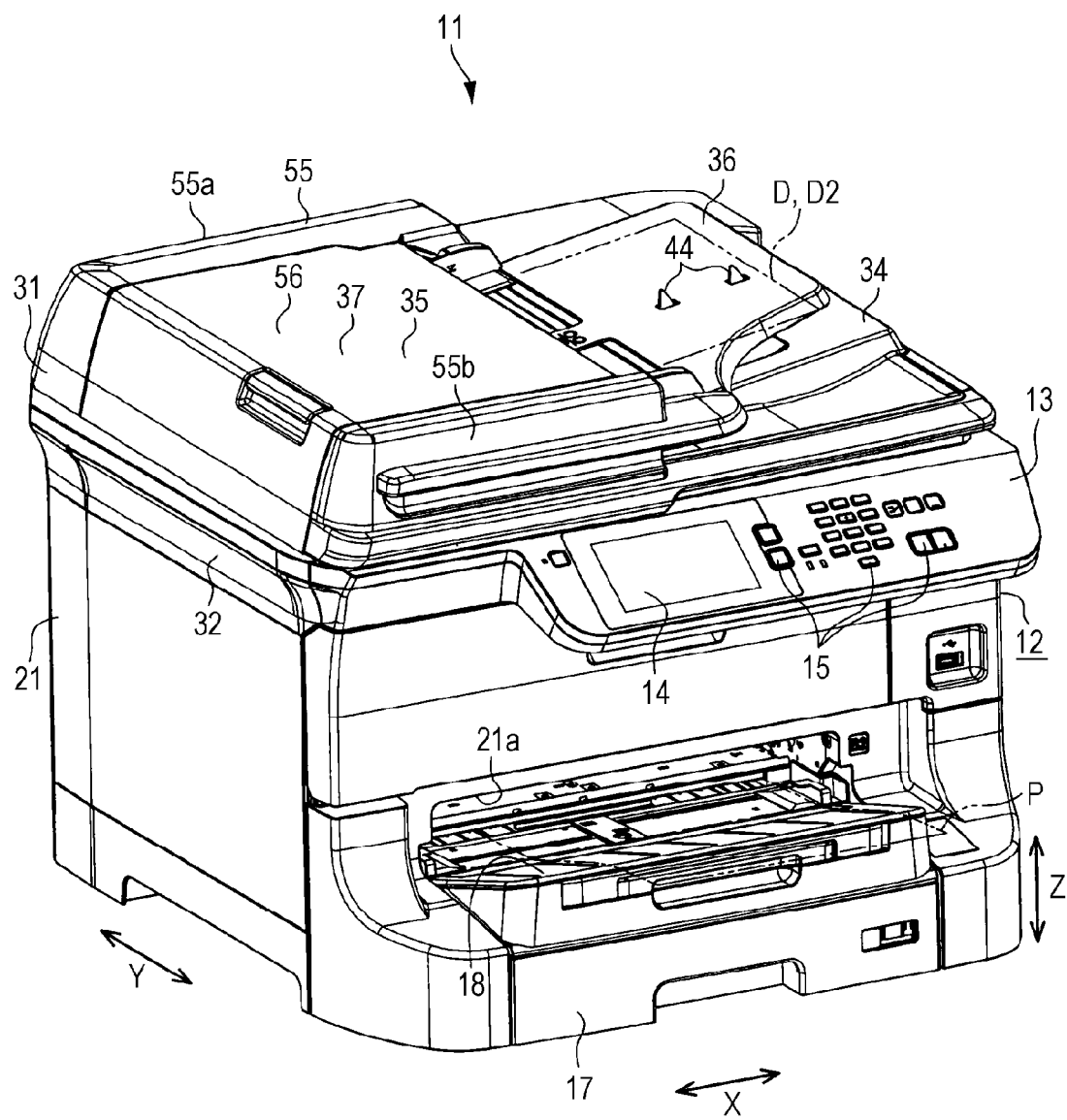
FIG. 1 is a perspective diagram of a multi-function machine according to a first embodiment.

As illustrated in FIG. 1, a multi-function machine 11 includes a printing apparatus 21 that performs printing on a medium P such as copy paper and an image reading device 31 that is arranged upstream of the printing apparatus 21 in the vertical direction Z.

An operation panel 13 provided in a device body 12 of the multi-function machine 11 includes a display unit 14 for displaying a menu image and the like and an operation unit 15 constituted by operation switches and the like. For example, by operating the operation unit 15, a scan request may be given to the multi-function machine 11. Moreover, it is possible to give a scan request to the multi-function machine 11 also from a host device constituted by a personal computer (PC) or the like connected to the multi-function machine 11 by a communication cable.

The printing apparatus 21 performs printing on the medium P supplied from a cassette 17 mounted in a lower portion of the device body 12. The medium P after being printed is ejected onto a stacker 18 from an ejection port 21a of the device body 12. The multi-function machine 11 has the functions of printing, scanning, and copying. Copying is performed by the printing apparatus 21 printing on the medium P an image based on image data of the document read by the image reading device 31.

As illustrated in FIG. 1, the image reading device 31 includes a device body 32 that has, in an upper portion of the device body 32, a document table 33 (refer to FIG. 2) of the flat bed type on which a document can be placed, and a document table cover 34 that is capable of covering/uncovering a surface portion of the document table 33 of the device body 32.

In this example, an automatic document feeder 35 (auto document feeder (ADF)) (below, also referred to as simply "document feeder 35") is installed in a rear surface portion (a portion that is on the side opposite to the document table 33) of the document table cover 34.

The document feeder 35 includes a tray 36 (set tray) for setting a plurality of documents D2 and a feeding mechanism unit 37 that feeds the documents D2 on the tray 36 one by one.

The feeding mechanism unit 37 performs feeding that involves feeding a document on the tray 36 up to a reading position SC (refer to FIG. 4) and ejecting the document after an image on the document has been read. Documents D after being subjected to image reading are, for example, sequentially ejected to an ejection portion between the tray 36 and the document table cover 34.

Further, details regarding the document feeder 35 and the feeding mechanism unit 37 will be described later.

Figure 2:
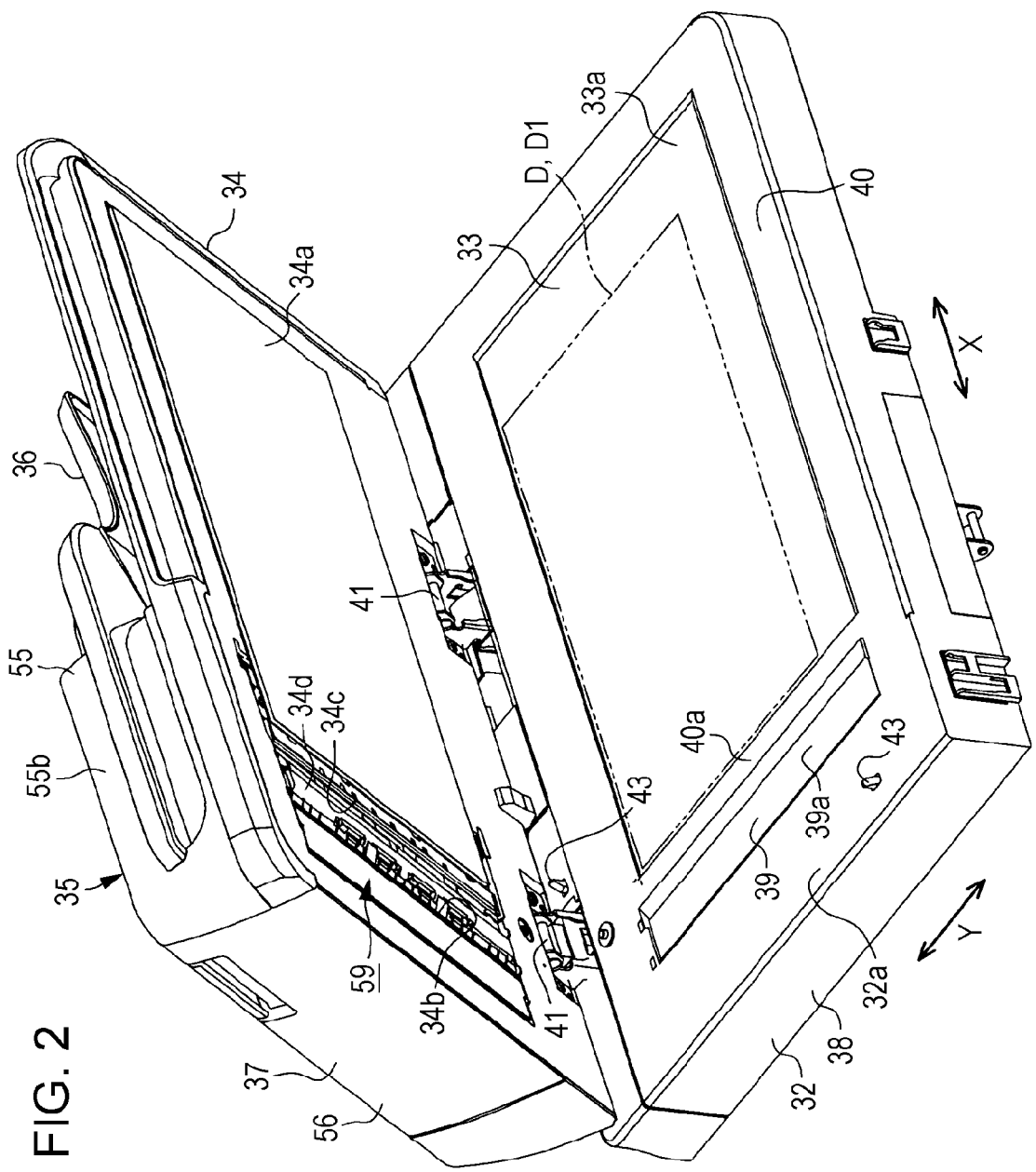
FIG. 2 is a perspective diagram of an image reading device with an open document table cover.

As illustrated in FIG. 2, the image reading device 31 includes a case 38 that is box-like and that has an opening portion on the upper side of the case 38, and the document table 33 in which a large glass member 33a having a rectangular shape is installed in a large opening portion of a frame portion 40 forming an upper surface portion of the case, and a reading window 39 in which a small glass member 39a having a long rectangular shape is installed in a small opening portion of the frame portion 40. The large glass member 33a and the small glass member 39a are composed of a colorless and transparent glass. Further, instead of the large glass member 33a and the small glass member 39a, a transparent plate composed of a transparent resin material or a ceramic material other than glass may be installed in the opening portion. The document table 33 is a portion in which a document to be read by a flat bed method is placed and has a size that is slightly wider than the size of the largest document that the image reading device 31 is capable of reading.

Moreover, the reading window 39 has a length in the longitudinal direction of the device body 12, in other words, the length in the sub-scanning direction X (left-right direction in FIG. 2), that is sufficiently shorter than the document table 33. Consequently, the reading window 39 is arranged on one side (the left side in FIG. 2) of the document table 33 in the longitudinal direction of the device body 12. Moreover, the reading window 39 is at the reading position SC (refer to FIG. 4) at which an image of a document that has been fed from the document feeder 35 is read.

Moreover, the frame portion 40, as illustrated in FIG. 2, has a dividing portion 40*a* that has a long rectangular shape that is between the document table 33 and the reading window 39 and that extends in the main scanning direction Y. In other words, the space between the document table 33 and the reading window 39 is divided by the dividing portion 40*a*.

The document table cover 34 is rotatably attached through a hinge 41 provided on the rear side of the device body 32. Consequently, the document table cover 34 is capable of opening/closing between a closed position for holding in place a document D1 placed on the document table 33 and an open state for setting the document on the document table 33 and removing the document after reading has been performed. A whiteboard 34*a* having a slightly larger size than the document table 33 is detachably attached to a surface (rear surface) of the document table cover 34 that faces the document table 33 by a well known method.

Moreover, a guide unit 34*d* having an elongated shape that extends along the main scanning direction Y is provided in a surface (rear surface) of the document table cover 34 that faces the document table 33 in a portion that faces the reading position SC. In this embodiment, the whole of the guide unit 34*d* is formed as a flat plate; however, as long as the surface that faces a reading unit 52 is a flat surface, the guide unit 34*d* is not limited to a plate and may be formed as a block or the like.

Because the document D1 that has been placed on the document table 33 has pressure applied thereto, the whiteboard 34*a* is read in a portion in which the document D1 on the document table 33 is not present.

The document D fed to the inside of the feeding mechanism unit 37 by the document feeder 35 is fed out onto the reading window 39 from a receiving port 34*b* (refer to FIG. 2) on the rear surface of the document table cover 34 in a closed state, the receiving port 34*b* opening at a position roughly facing the reading window 39, and after an image has been read at the reading window 39, enters a discharging port 34*c* and is ejected to an ejection portion. At this time, because the document D is pushed against the reading window 39 by the guide unit 34*d* that has an elongated shape that extends in the main scanning direction Y, it is possible to perform relatively high quality reading of an image of a document that is being fed.

The image reading device 31 operates in two modes, namely, a Flatbed (FB) mode in which a document that has been placed on the document table 33 of the flat bed type is read and an Auto Document Feeder (ADF) mode in which a document that has been fed from the tray 36 by the document feeder 35 along a path that passes the reading window 39 is read at the position of the reading window 39 while being fed.

As illustrated in FIG. 2, a first sensor 43 that detects whether the document table cover 34 has been closed is provided in an upper surface portion 32*a* of the device body 32. The first sensor 43 is in a detection state when the document table cover 34 is in a closed state and is in a non-detection state when the document table cover 34 is not in a closed state. Moreover, as illustrated in FIG. 1, a second sensor 44 that is capable of detecting whether a document has been set is provided in the tray 36 of the document feeder 35.

Figure 3:
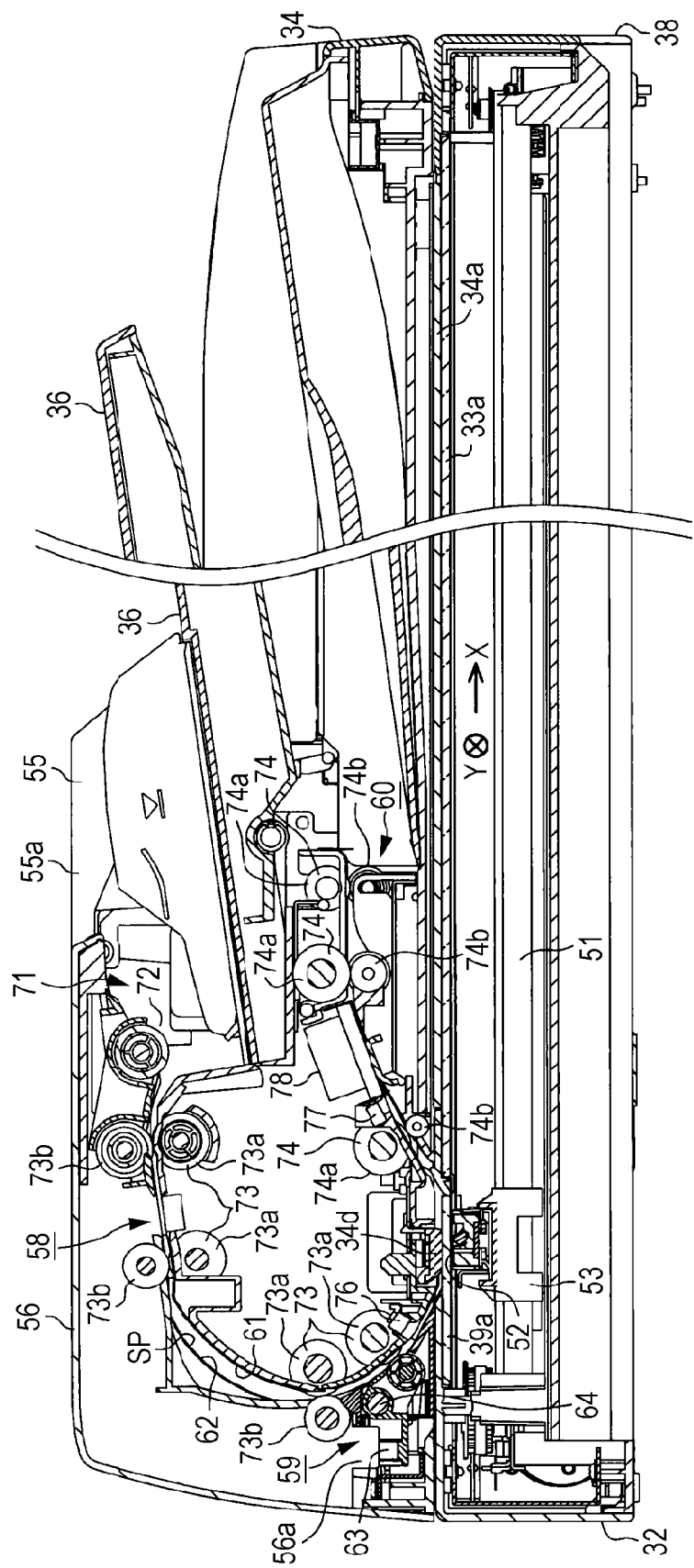
FIG. 3 is a side cross-sectional diagram illustrating an outline of the structure of the image reading device provided in an automatic document feeder.
Figure 4:
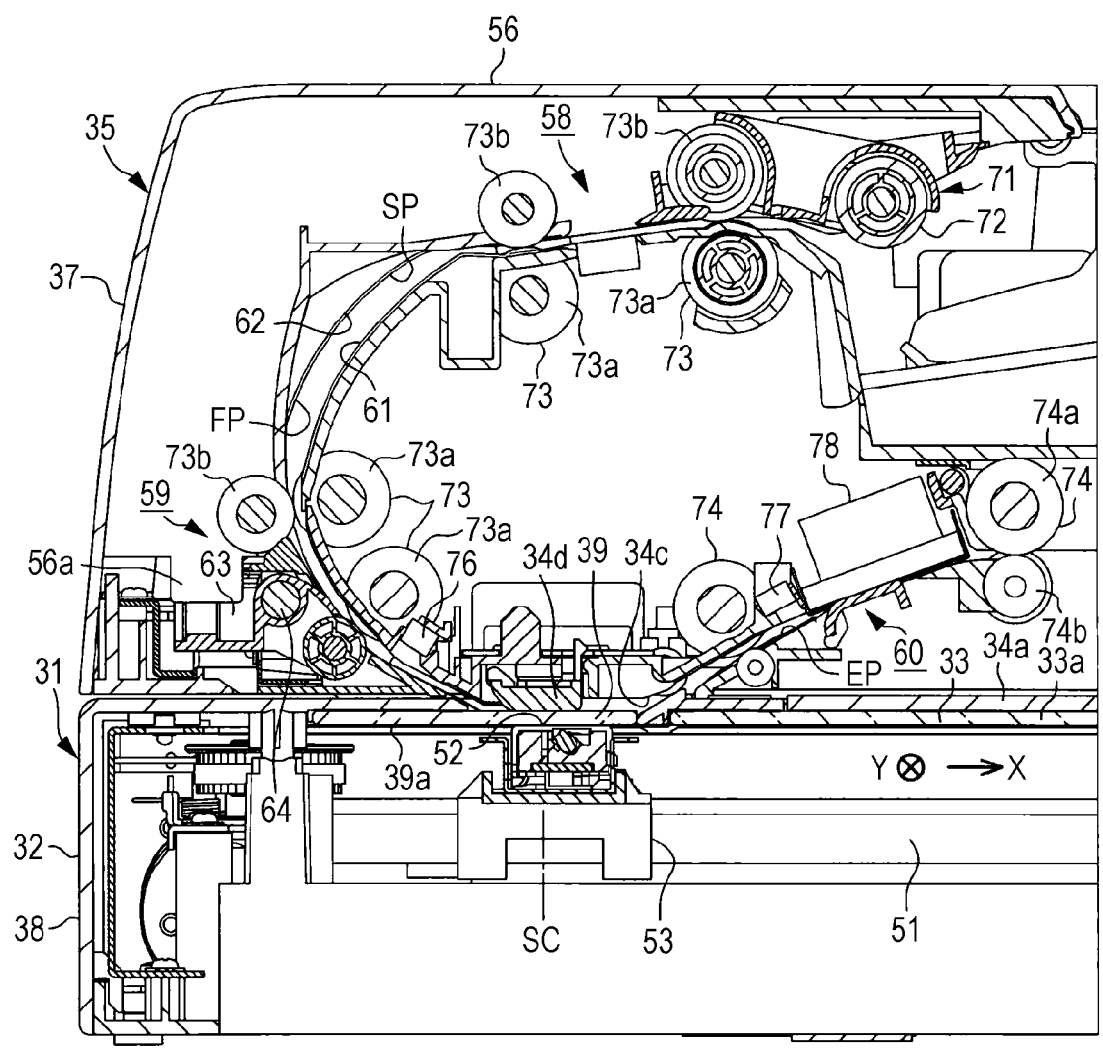
FIG. 4 is a partial side cross-sectional diagram illustrating an outline of the structure of the image reading device provided in the automatic document feeder.

As illustrated in FIG. 3 and FIG. 4, a guide rail 51 that extends in the longitudinal direction (sub-scanning direction X) of the device body 32 is arranged in the case 38. Moreover, in the case 38, a sensing carriage 53 (below, referred to as simply "carriage 53") having the reading unit 52 is supported by the guide rail 51. The reading unit 52 is formed of an image sensor that forms a reading line for reading a document in the main scanning direction Y that intersects the sub-scanning direction X. Specifically in this case, as an example of the image sensor, a contact-type image sensor (contact image sensor (CIS)) is used.

An electric motor (not illustrated) that moves the carriage 53 in the sub-scanning direction X and a motive power transmission mechanism (not illustrated) that transmits motive power of the electric motor to the carriage 53 are housed in the case 38. Consequently, the carriage 53 reciprocates in the sub-scanning direction X by normal rotation and reverse rotation of the electric motor.

That is, by the carriage 53 moving in the sub-scanning direction X along the guide rail 51, a document D1 placed on the document table 33 is read by the reading unit 52. In this embodiment, the sub-scanning direction X is a direction that intersects both the vertical direction Z and the main scanning direction Y. Further, as the image sensor, for example, a charge coupled device (CCD) image sensor may be used.

Regarding the Document Feeder 35 and the Feeding Mechanism Unit 37

At first an outline of the document feeder 35 and the feeding mechanism unit 37 will be described.

As illustrated in FIG. 4, the document feeder 35 includes a supplying roller 72 that forms one portion of a supplying mechanism 71 that feeds a document from the tray 36 toward a document feeding path FP in the feeding mechanism unit 37 and a plurality of supply roller pairs 73 that are provided along a supply path SP and that feed a document that has been fed by the supplying roller 72 toward the reading position SC. Consequently, a document that has been supplied by the plurality of supply roller pairs 73 is read by the reading unit 52 of the carriage 53 located at the reading position SC while being fed. A document that has been read is ejected from the feeding mechanism unit 37 toward the outside by a plurality of ejection roller pairs 74 that are provided along an ejection path EP. Further, the ejection roller pairs 74 include driving rollers 74*a* that are provided in a mechanism body unit 58 and driven rollers 74*b* that are provided in a downstream-side unit 60.

At the reading position SC, the guide unit 34*d* that has an elongated shape and that guides a document along a surface of the reading window 39 (the small glass member 39*a*) is arranged so as to extend in the main scanning direction Y.

In this way, in the ADF mode, a plurality of documents set in the tray 36 are separated one by one, are fed along a path that goes through the reading position SC via the document feeding path FP formed in the feeding mechanism unit 37, and are read by the reading unit 52 of the carriage 53 that has stopped at the reading position SC while being fed. The document feeding path FP is formed of the supply path SP that supplies a document from the tray 36 to the reading position SC and the ejection path EP that ejects a document from the reading position SC to an ejection portion of an outside portion.

Moreover, as illustrated in FIG. 4, a first detection unit 76 that is capable of detecting a document that is being supplied along the supply path SP at a position upstream of the reading position SC in the feeding direction and a second detection unit 77 that is capable of detecting a document that is being ejected at a position downstream of the reading position SC in the feeding direction are provided in the feeding mechanism unit 37. Furthermore, a reading unit 78 that is capable of reading a surface (rear surface) of a document, the surface being on the side opposite to the reading surface (front surface) of the document that is read by the reading unit 52 while the document is on the ejection path EP, is arranged at a position downstream of the second detection unit 77 in the feeding direction. Consequently, the image reading device 31 is capable of reading both surfaces of a document while in the ADF mode.

Next, details regarding the document feeder 35 will be described.

Figure 6:
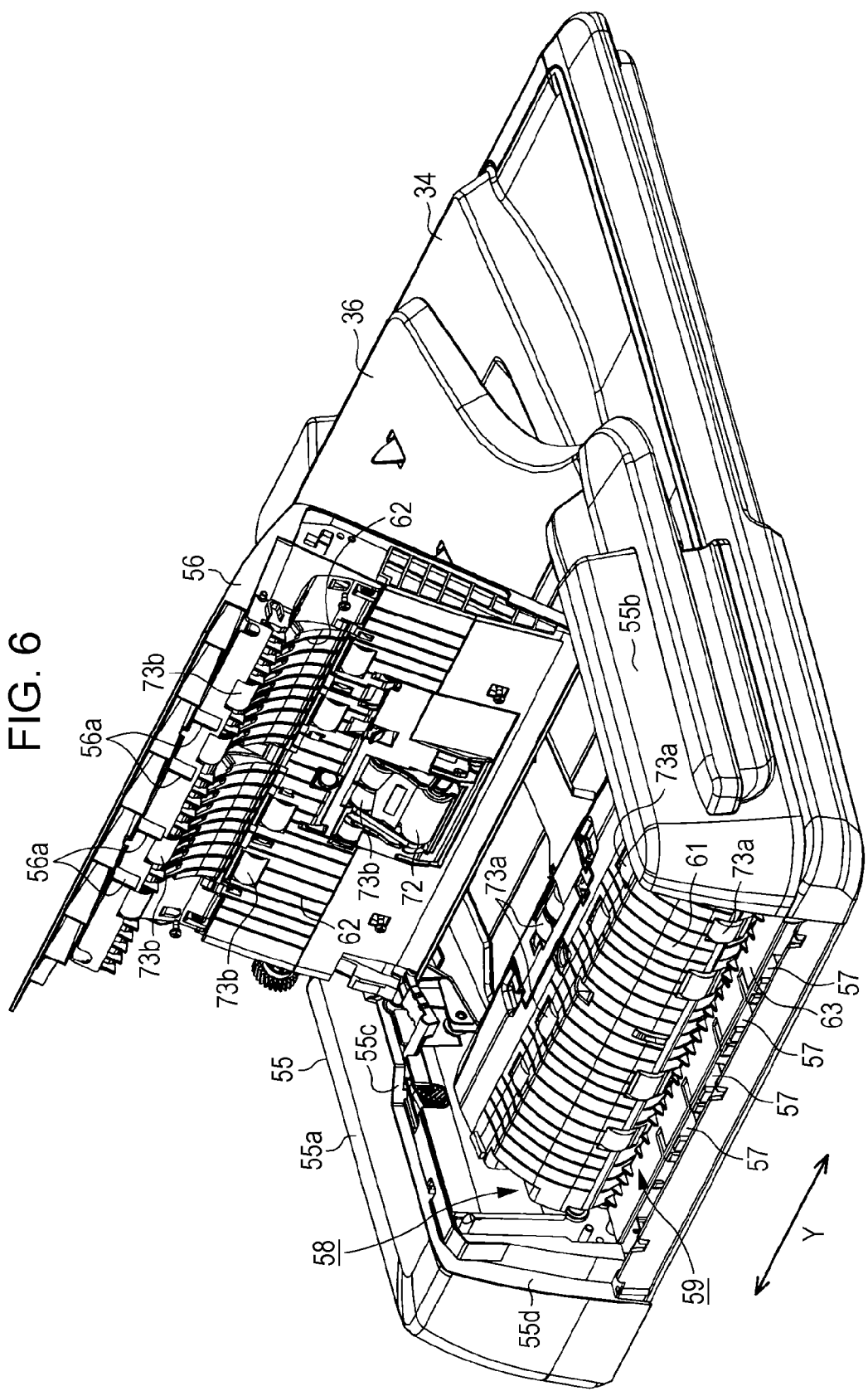
FIG. 6 is a perspective diagram of a cover of the automatic document feeder in an open state.

A mechanism unit case 55 provided with the tray 36 is formed in an upper portion of the document table cover 34. The mechanism unit case 55 has, as illustrated in FIG. 6, a pair of sidewalls 55a and 55b that are separated from each other in the main scanning direction Y. Moreover, an upper portion space between the sidewalls 55a and 55b and an end portion space on the side opposite to the tray 36 in the sub-scanning direction X have an upper portion opening 55c and an end portion opening 55d, respectively. At the upper ends of the sidewalls 55a and 55b of the mechanism unit case 55, a mechanism unit cover 56 is supported so as to be freely openable/closeable, and the upper portion opening 55c and the end portion opening 55d are capable of being in the closed state illustrated in FIG. 1, FIG. 3, and FIG. 4, and in the open state illustrated in FIG. 6.

As illustrated in FIG. 3, FIG. 4, FIG. 6, and FIG. 7, the mechanism body unit 58, an upstream-side unit 59 and the downstream-side unit 60 are provided in the mechanism unit case 55.

The mechanism body unit 58 includes the guide unit 34d that, when the document table cover 34 is in the closed state, is arranged so as to face the small glass member 39a as illustrated in FIG. 4. Moreover, the upstream-side unit 59 is arranged on the upstream side of the document feeding path FP and the downstream-side unit 60 is arranged on the downstream side of the document feeding path FP in such a manner as to have the guide unit 34d interposed therebetween.

Here, the upstream-side unit 59 and the downstream-side unit 60 are each an example of the first unit. Moreover, the mechanism body unit 58 is an example of the second unit. In this way, a pair of first units are arranged on the upstream and downstream sides of the guide unit 34d arranged at the reading position SC. In other words, a pair of first units are arranged on the upstream and downstream sides of the reading unit 52 located at the reading position SC in the document feeding path FP.

The mechanism body unit 58, when both surfaces of a document are being read, has a guide surface 61 that guides the surface side of the document being read by the reading unit 78. The guide surface 61 is an example of the second surface. Driving rollers 73a of the supply roller pairs 73 provided in the supply path SP are arranged in the guide surface 61.

Moreover, as illustrated in FIG. 3, FIG. 4, FIG. 6, and FIG. 7, inside the mechanism unit cover 56, there is a guide surface 62 that guides, when single-sided or double-sided reading is being performed, a surface side of a document being read by the reading unit 52. Portions of driven rollers 73b of the supply roller pairs 73 provided in the supply path SP and the supplying roller 72 are arranged in the guide surface 62.

As illustrated in FIG. 5A, the upstream-side unit 59 has a unit body 63 that extends in the main scanning direction Y. An arrow A illustrated in FIG. 5A indicates the feeding direction.

A holder 57 that freely rotatably supports the driven rollers 73b of the supply roller pairs 73 is included in the unit body 63. A pair of supporting shafts 64 protrude toward an end surface 63a of both end portions of the unit body 63 in the main scanning direction Y, and are freely rotatably supported by both sidewalls 55a and 55b of the mechanism unit case 55 illustrated in FIG. 6. That is, by providing the supporting shafts 64 at the end surfaces 63a in an upstream-side portion of the unit body 63 in the feeding direction A, a downstream-side portion of the unit body 63 in the feeding direction becomes freely rockable. The supporting shafts 64 are an example of the pivot. Moreover, the unit body 63 rotates about the supporting shafts 64. The rotation direction of the unit body 63 corresponds to the direction of movement of the first unit.

Figure 8:
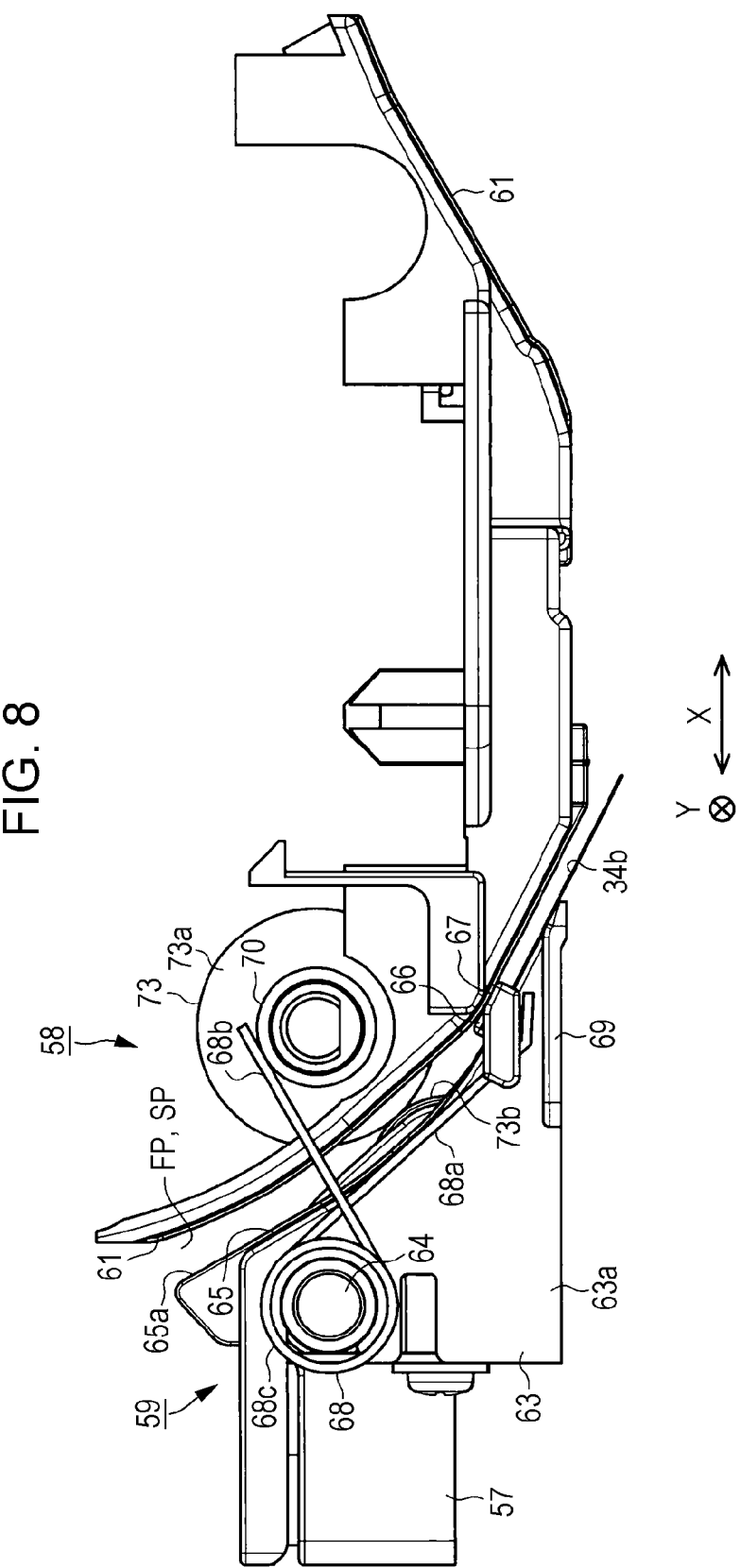
FIG. 8 is a schematic side view of the upstream-side unit of the automatic document feeder in a closed state with respect to a body side unit.

Moreover, a guide surface 65 of the unit body 63 that faces the guide surface 61 of the mechanism body unit 58 is formed so as to follow the guide surface 61. In this embodiment, as illustrated in FIG. 8, as the guide surface 61 is a protruding curved surface, the guide surface 65 is formed so as to be a depressed curve. Moreover, the guide surface 65 has a plurality of guide ribs 65a in the main scanning direction Y. The guide surface 65 is an example of the first surface. The space between the guide surface 62 and the guide surface 61, and the space between the guide surface 65 and the guide surface 61 form the supply path SP of the document feeding path FP.

Figure 9:
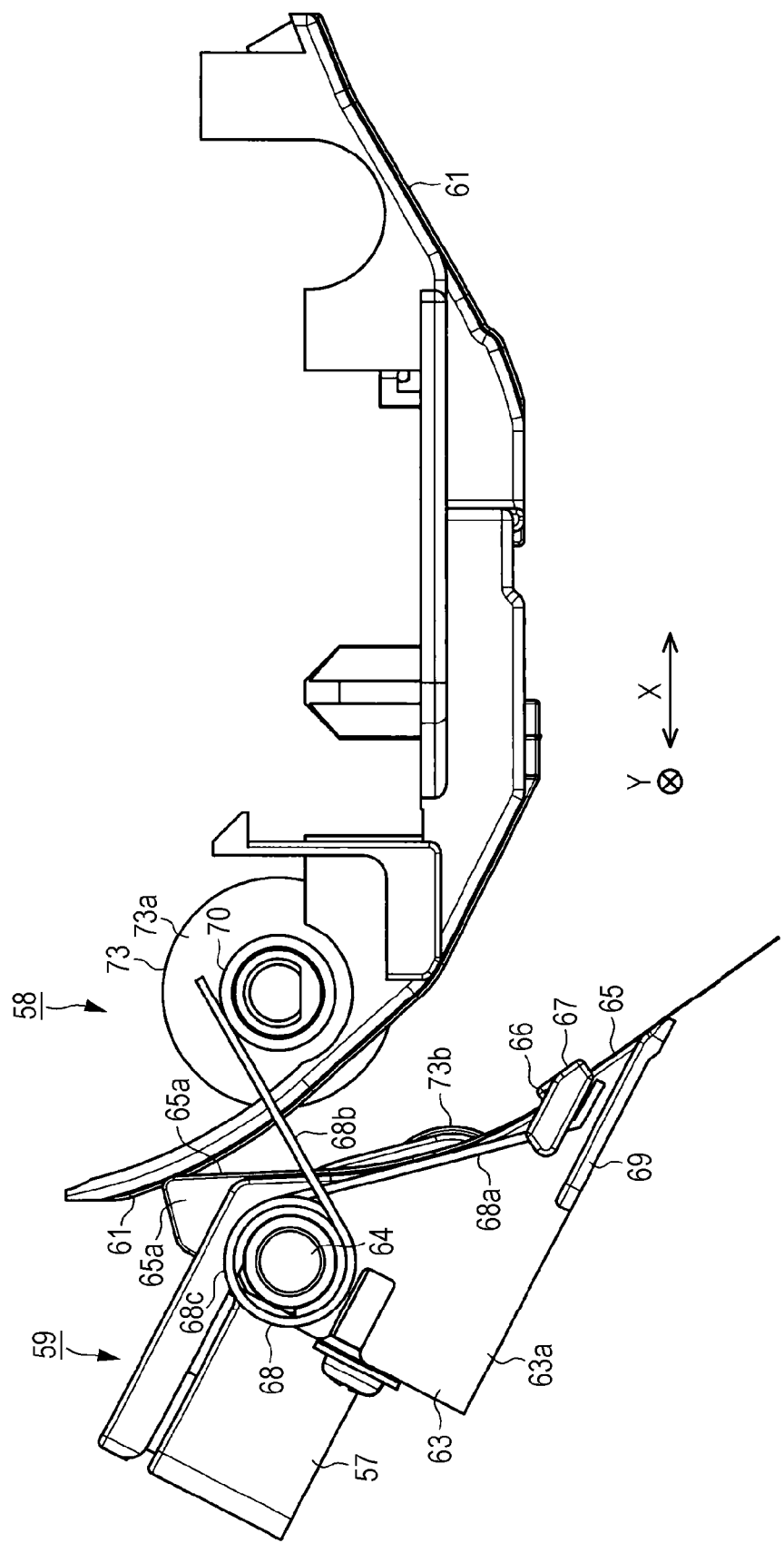
FIG. 9 is a schematic side view of the upstream-side unit of the automatic document feeder in an open state with respect to the body side unit.

FIG. 8 and FIG. 9 are schematic explanatory diagrams in which the guide unit 34d of the mechanism body unit 58 is not illustrated.

Locking members 66 are individually provided in a downstream-side portion of each of the end surfaces 63a of the unit body 63 in the feeding direction and protruding portions 67 on the side opposite to the guide surface 65 are integrally arranged in parallel in the locking members 66.

That is, the locking members 66 are arranged at positions adjacent to end portions (that is, the end surfaces 63a) of the guide surface 65 in the width direction of a document. Further, the width direction of a document is a direction corresponding to the main scanning direction Y and corresponding to the width direction of the document feeding path.

As illustrated in FIG. 5A, regarding the locking members 66, side surfaces 66a that face the document passing along the guide surface 65 each have a shape that tapers toward the inside of the feeding portion that forms a portion of the document feeding path FP and toward the downstream side in the feeding direction A. When the document passing through the feeding portion touches the side surfaces 66a with the tapered shape, the document is guided in the feeding direction so as to be smoothly fed.

Moreover, the protruding portions 67 are on both sides of the unit body 63 in the width direction of the document outside the feeding portion that forms a portion of the document feeding path FP and are provided at positions that overlap the locking members 66 in the main scanning direction Y (in other words, the width direction of the document). As illustrated in FIG. 5A, FIG. 5B, FIG. 8, and FIG. 9, winding portions 68c of torsion springs 68 serving as urging members are wound around the supporting shafts 64. First ends 68a of the torsion springs 68 are locked by the locking members 66 and second ends 68b are locked by shaft portions 70 that support the driving rollers 73a of the supply roller pairs 73. The locking members 66 are an example of the first locking portions. The shaft portions 70 are an example of the second locking portions. Further, the second locking portions that lock the second ends 68b of the torsion springs 68 are not limited to the shaft portions 70, and may be members of the mechanism body unit 58 or members that are fixed to either of the sidewalls 55a and 55b.

The protruding portions 67 protrude toward the guide surface 61 of the mechanism body unit 58 and the unit body 63 is urged toward the guide surface 61 of the supply path SP of the mechanism body unit 58 by the torsion springs 68. Further, this urging force is described later. By making the protruding portions 67 come in contact with the guide surface 61 of the mechanism body unit 58, positioning of the upstream-side unit 59 with respect to the mechanism body unit 58 is performed. By doing this, the accuracy of the document feeding path FP (here, the supply path SP) clearance between the guide surface 65 and the guide surface 61 of the mechanism body unit 58 is increased.

As illustrated in FIG. 5A, FIG. 5B, FIG. 8, and FIG. 9, a cover member 69 that covers a surface (in FIG. 8, a lower surface) of the locking members 66 on the side opposite to the guide surface 65 is integrally formed on the downstream side of the end surfaces 63a of the unit body 63 in the feeding direction A. As a result of using the cover member 69, the surface (in FIG. 8, lower surface) of the locking members 66 on the side opposite to the guide surface 65 is not exposed and portions of the first ends 68a that are locked by the locking members 66 and that protrude from the locking members 66 toward the side opposite to the guide surface 65 are covered. By doing this, because the side of the first locking portions opposite to the first surface is not exposed, the end portions of the urging members that are locked by the first locking portions cannot be touched by a worker and it is possible to perform maintenance work safely.

As illustrated in FIG. 3 and FIG. 4, when the mechanism unit cover 56 is in the closed state, in the upstream-side unit 59, a plurality of locking protrusions 56a on a sidewall lower portion of the free end side of the mechanism unit cover 56 parallelly arranged in the main scanning direction Y contact-lock, from above, a portion located at a position closer to the protruding portions 67 side of the unit body 63 than the supporting shafts 64. Consequently, the unit body 63 rotates about the supporting shafts 64, and, as illustrated in FIG. 8, the protruding portions 67 are in contact with the guide surface 61 of the mechanism body unit 58.

Figure 7:
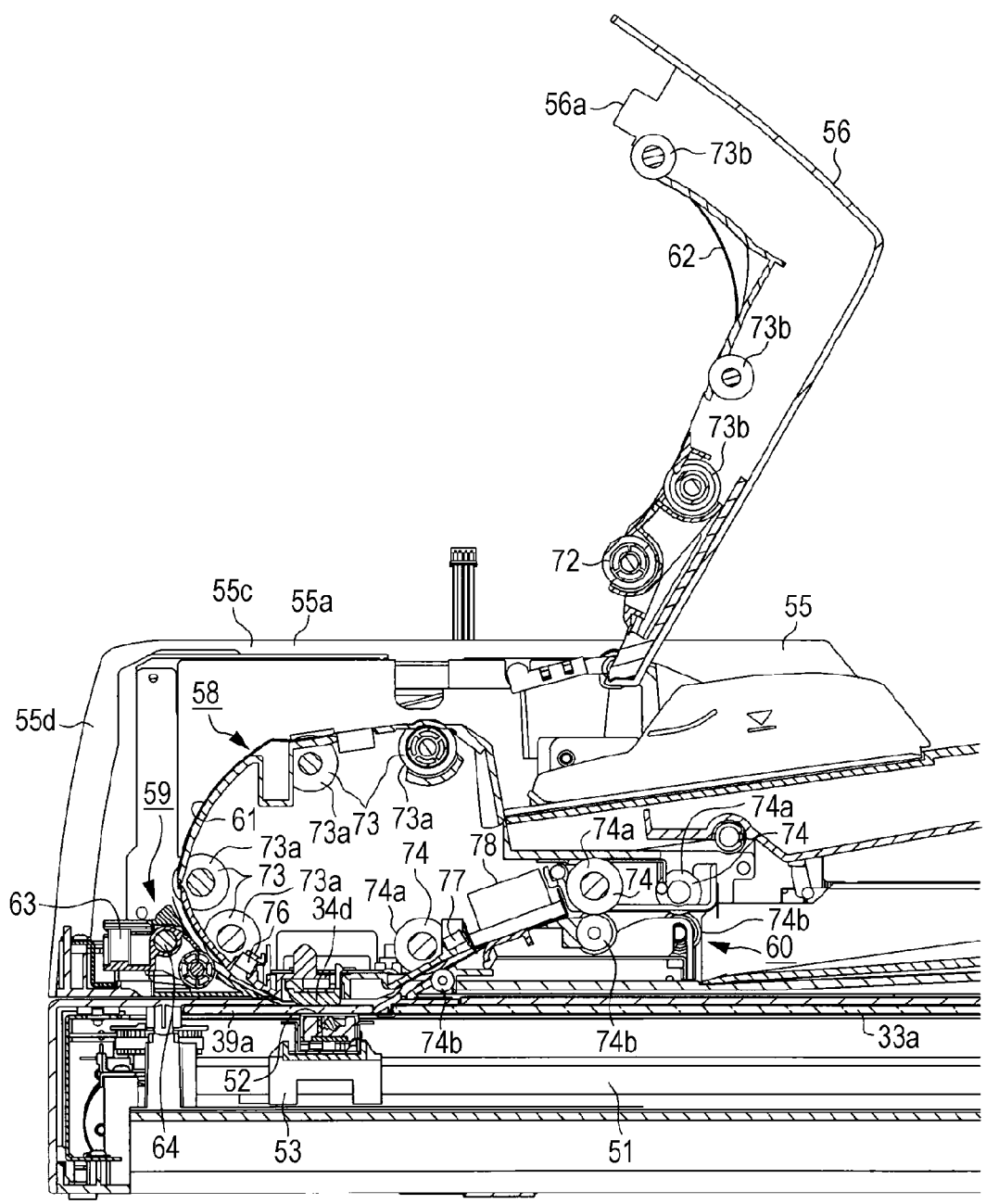
FIG. 7 is a partial side cross-sectional diagram illustrating an outline of the structure of the image reading device when the cover of the automatic document feeder is in an open state.

As illustrated in FIG. 6 and FIG. 7, when the mechanism unit cover 56 is in the open state, because the pressing force of the locking protrusions 56a of the mechanism unit cover 56 is cancelled, the unit body 63 rotates in a clockwise direction from the state illustrated in FIG. 8 about the supporting shafts 64 as illustrated in FIG. 9, and it is possible to separate the protruding portions 67 from the guide surface 61 of the mechanism body unit 58. Further, consequently in the state where the restriction by the mechanism unit cover 56 of the mechanism body unit 58 is cancelled, as illustrated in FIG. 9, the urging force of the torsion springs 68 is set in such a manner as to inhibit sudden rotation of the downstream portion of the unit body 63 in the feeding direction due to the weight of the unit body 63 and allow the rotation thereof.

Figure 10:
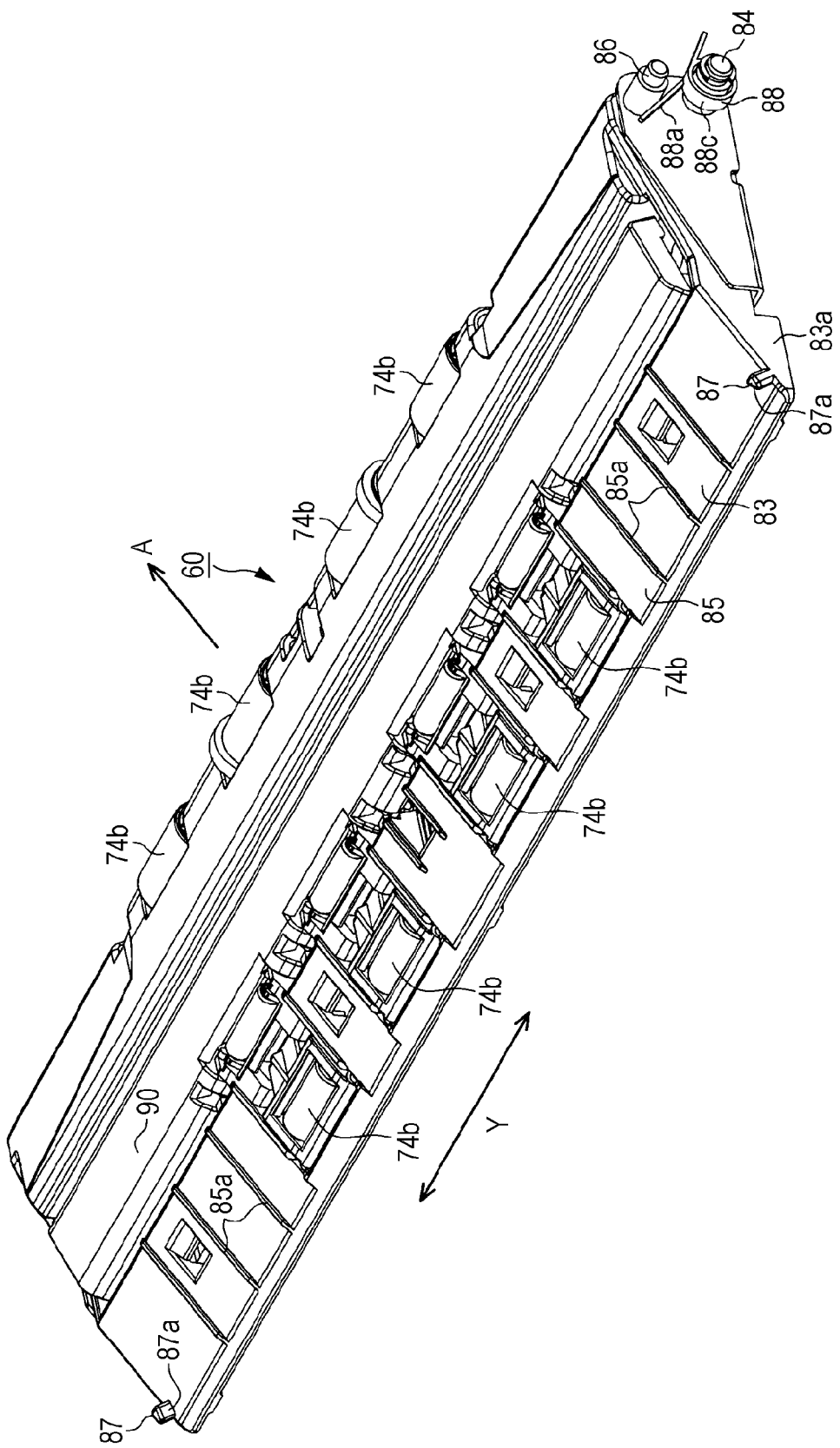
FIG. 10 is a perspective diagram of a downstream-side unit that serves as the first unit.

As illustrated in FIG. 10, the downstream-side unit 60 has a unit body 83 that extends out in the main scanning direction Y. The arrow A illustrated in FIG. 10 indicates the feeding direction. The driven rollers 74b of the ejection roller pairs 74 are freely rotatably supported in the unit body 83.

A pair of supporting shafts 84 that protrude from end surfaces 83a of both end portions of the unit body 83 in the main scanning direction Y are freely rotatably supported by both of the sidewalls 55a and 55b of the mechanism unit case 55 illustrated in FIG. 6. That is, by providing the supporting shafts 84 at the end surfaces 83a in a downstream-side portion of the unit body 83 in the feeding direction A, an upstream-side portion of the unit body 83 in the feeding direction becomes freely rockable. The supporting shafts 84 are an example of the pivot. Moreover, the unit body 83 rotates about the supporting shafts 84. The rotation direction of the unit body 83 corresponds to the direction of movement of the first unit.

Figure 11:
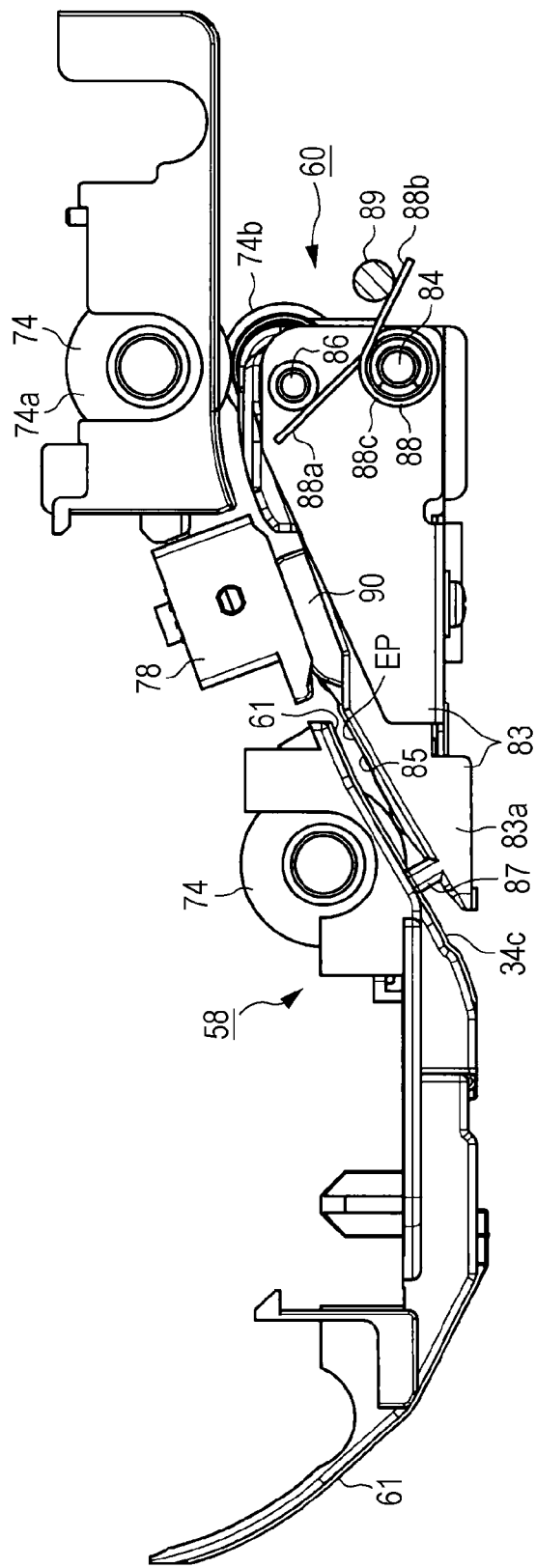
FIG. 11 is a schematic side view of the downstream-side unit of the automatic document feeder in a closed state with respect to the body side unit.

Moreover, a guide surface 85 of the unit body 83 that faces the guide surface 61 of the mechanism body unit 58 is formed so as to follow the guide surface 61. In this embodiment, as illustrated in FIG. 11, the guide surface 85 is formed in such a manner as to also have a substantially flat surface similar to that of the guide surface 61. Moreover, the guide surface 85 has a plurality of guide ribs 85a arranged along the main scanning direction Y. The guide surface 85 is an example of the first surface.

The space between the guide surface 61 and the guide surface 85 of the mechanism body unit 58 forms the ejection path EP of the document feeding path FP.

Figure 12:
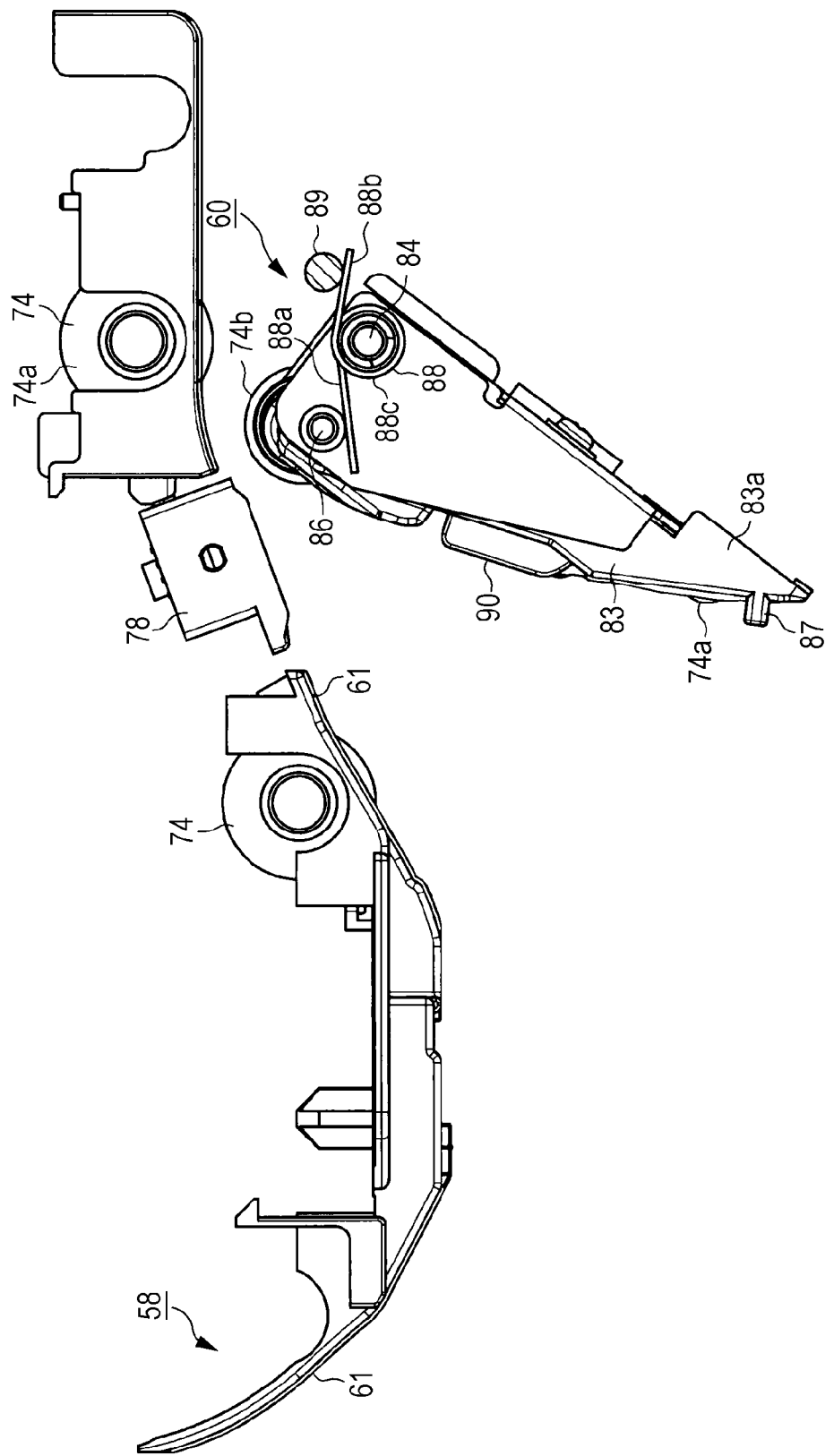
FIG. 12 is a schematic side view of the downstream-side unit of the automatic document feeder in an open state with respect to the body side unit.

In the upstream side of each of the end surfaces 83a of the unit body 83 in the feeding direction, a corresponding one of locking members 86 protrudes in the main scanning direction Y at a portion above the supporting shafts 84. As illustrated in FIG. 10, FIG. 11, and FIG. 12, torsion springs 88 are provided to the supporting shafts 64 as urging members. The torsion springs 88 have winding portions 88c that are wound around the supporting shafts 84 and first ends 88a of the torsion springs 88 are locked by the locking members 86 and second ends 88b are locked by fixing members 89 that are integrally fixed to the sidewalls 55a and 55b. The locking members 86 are an example of the first locking portions. The fixing members 89 are an example of the second locking portions.

A corresponding one of protruding portions 87 integrally protrudes from an upstream-side portion of each of the end surfaces 83a of the unit body 83 in the feeding direction. The protruding portions 87 protrude toward the guide surface 61 of the mechanism body unit 58 and the unit body 83 is urged toward the guide surface 61 of the ejection path EP of the mechanism body unit 58 by the torsion springs 88. The urging force of the torsion springs 88 is, as illustrated in FIG. 12, set in such a manner that, when the downstream-side unit 60 is to be opened, the downstream-side unit 60 does not suddenly open due to its weight.

In an installed state in which the whiteboard 34a, which is attached to a surface (rear surface) of the document table cover 34 faces the document table 33, the unit body 83 is subjected to a pressing force from a member (not illustrated) on the whiteboard 34a side, and the protruding portions 87 of the downstream-side unit 60 are positioned with respect to the mechanism body unit 58 by making the protruding portions 87 come in contact with the guide surface 61 of the mechanism body unit 58. By doing this, the accuracy of the document feeding path FP (here, the ejection path EP) clearance between the guide surface 85 and the guide surface 61 of the mechanism body unit 58 is increased.

Moreover, as illustrated in FIG. 10, regarding the protruding portions 87, side surfaces 87a that face the document passing along the guide surface 85 have a shape that tapers toward the inside of the feeding portion that forms the ejection path EP (a portion of the document feeding path FP) and toward the downstream side in the feeding direction A. When the document passing through the feeding portion touches the side surfaces 87a with the tapered shape, the document is guided in the feeding direction so as to be smoothly fed.

As illustrated in FIG. 10, a guide portion 90 having an elongated shape that extends in the main scanning direction Y is arranged in the guide surface 85 of the unit body 83. As illustrated in FIG. 11, the guide portion 90 urged by an urging means (not illustrated), in a state where the downstream-side unit 60 is in a closed state with respect to the mechanism body unit 58, is pushed toward the reading unit 78 during feeding and it is possible to perform relatively high quality reading of an image of a document that is being fed.

Effect of the Embodiment

The effect of the document feeder 35 formed as described above will be described.

1. The Upstream-side Unit 59 and the Downstream-side Unit 60 Closed State

As illustrated in FIG. 1, FIG. 3, and FIG. 4, in a state where the mechanism unit cover 56 is closed, as for the unit body 63, as illustrated in FIG. 8, the protruding portions 67 are in a state where they are in in contact with the guide surface 61 of the mechanism body unit 58. In this state, the document feeding path FP, that is, the supply path SP, is formed between the guide surface 65 of the upstream-side unit 59 and the guide surface 61 of the mechanism body unit 58. Then, in this state, because the protruding portions 67 are positioned so as to be outside the document feeding path on both sides of the document in the width direction, it is possible to increase the accuracy of clearance for allowing a document to pass through the document feeding path.

Moreover, as illustrated in FIG. 3, in an installed state in which a surface (rear surface) of the whiteboard 34a faces the document table 33 of the document table cover 34, as illustrated in FIG. 11, the document feeding path FP, that is, the ejection path EP, is formed between the guide surface 61 of the mechanism body unit 58 and the guide surface 85 of the downstream-side unit 60. Then, in this state, because positioning of the protruding portions 87 provided outside the document feeding path on both sides of the document in the width direction is performed, it is possible to increase the accuracy of clearance for allowing a document to pass through the document feeding path.

2. The Upstream-side Unit 59 and the Downstream-side Unit 60 Closed State

As illustrated in FIG. 6 and FIG. 7, when the mechanism unit cover 56 is in the open state, because the pressing force of the locking protrusions 56a of the mechanism unit cover 56 is cancelled, the unit body 63 of the upstream-side unit 59 rotates in a clockwise direction from the state illustrated in FIG. 8 about the supporting shafts 64 as illustrated in FIG. 9, and the protruding portions 67 become separated from the guide surface 61 of the mechanism body unit 58. At this time, sudden rotation of the unit body 63 does not occur due to the urging force of the torsion springs 68.

Moreover, when removing the whiteboard 34a from the document table cover 34 by a well known method, as illustrated in FIG. 12, when opening the downstream-side unit 60, the unit body 83 of the downstream-side unit 60 rotates and, because of the torsion springs 88, does not open suddenly due to its own weight.

Consequently, in a state where the upstream-side unit 59 and the downstream-side unit 60 are open, because there is a state in which each of the first units on the upstream and downstream sides of the reading unit 52 (the guide units 34d) are open, in that position, it becomes easy to remove a document that has become jammed.

According to the above-described embodiment, it is possible to obtain the effect described below.

(1) The upstream-side unit 59 and the downstream-side unit 60 of the document feeder 35 have the protruding portions 67 and 87 that protrude toward the surface that forms the document feeding path FP in the mechanism body unit 58 on both sides of a document in the width direction outside the feeding portion that forms the document feeding path FP. By making the protruding portions 67 and 87 contact the guide surface 61 that forms the document feeding path FP of the mechanism body unit 58, the protruding portions 67 and 87 perform positioning of the upstream-side unit 59 and the downstream-side unit 60 that are rotatably provided with respect to the mechanism body unit 58. By adopting this configuration, because the protruding portions 67 and 87 provided on both sides of the document in the width direction outside the document feeding path perform positioning, it is possible to increase the accuracy of clearance for allowing a document to pass through the document feeding path.

(2) The upstream-side unit 59 and the downstream-side unit 60 have the supporting shafts 64 and 84 that rotate in a rotation direction. The supporting shafts 64 are provided on a portion side of the upstream-side unit 59 on an upstream side in the feeding direction of the document feeding path FP in the upstream-side unit 59. The protruding portions 67 are provided on a downstream portion of the upstream-side unit 59 in the feeding direction in the document feeding path FP.

The supporting shafts 84 are provided on a downstream portion of the downstream-side unit 60 in the feeding direction of the document feeding path FP in the downstream-side unit 60. The protruding portions 87 are provided on an upstream portion of the downstream-side unit 60 in the feeding direction in the document feeding path FP. By adopting this configuration, because the protruding portions are positioned far from the supporting shafts 64 and 84, it is possible to increase the accuracy of clearance for allowing a document to pass through the document feeding path.

(3) The upstream-side unit 59 has the torsion springs 68 that provide an urging force in the rotation direction. The torsion springs 68 have the winding portions 68c that are wound about the supporting shafts 64. The locking members 66 (first locking portions) that lock a first end of the torsion springs 68 are provided in the protruding portions 67 provided in the upstream-side unit 59, and the shaft portions 70 (second locking portions) that lock a second end of the torsion springs 68 are provided in the mechanism body unit 58.

By adopting this configuration, when positioning the upstream-side unit 59 with respect to the mechanism body unit 58, by using the protruding portions 67, the accuracy of clearance for allowing a document to pass through the document feeding path is increased because the upstream-side unit 59 is urged and moved toward the mechanism body unit 58 by the torsion springs 68 (urging members). Moreover, by adopting this configuration, because it is possible to obtain an urging force in the rotation direction by the torsion springs 68, it is possible for protruding portions to reliably make the upstream-side unit 59 contact the mechanism body unit 58.

(4) The locking members 66 (first locking portions) and the protruding portions 67 of the upstream-side unit 59 are provided at positions that overlap a document in the width direction. By adopting this configuration, because the torsion springs 68 that are locked by the locking members 66 (first locking portions) and the protruding portions 67 are not staggered in the width direction of the document, the document feeding path FP does not become deformed, and it is possible to increase the accuracy of clearance of the document feeding path FP.

(5) The locking members 66 (first locking portions) of the upstream-side unit 59 are provided at positions that are adjacent to end portions of the guide surface 61 (first surface) in the width direction. By adopting this configuration, the device becomes more compact in the width direction of the document feeding path.

Moreover, by there being protruding portions, first ends of the urging members that are locked at the first ends by the first locking portions are prevented from coming off by the protruding portions.

(6) As for, the locking members 66 (first locking portions) of the upstream-side unit 59, the side surfaces 66a that face a document that is passing through the guide surface 61 (first surface) have a shape that tapers toward the downstream side in the feeding direction and toward the inside of the feeding portion. By adopting this configuration, when a document being fed through the document feeding path comes in contact with the protruding portions 67, the document is guided and fed smoothly in the feeding direction because of the shape of the protruding portions 67 that tapers toward the inside of the feeding portion.

(7) The cover member 69 that covers the locking members 66 (first locking portions) is provided on the side of the locking members 66 of the upstream-side unit 59 opposite to the guide surface 61 (first surface). By adopting this configuration, it is possible to safely perform a maintenance operation without the first end of the torsion springs 68 (urging member) that is locked by the locking members 66 (first locking portions) being touched by a worker because the side of the locking members 66 (first locking portions) opposite to the guide surface 61 (first surface) is not exposed due to the cover member 69.

(8) As for the document feeder 35, the reading unit 52 that reads a document is provided in the document feeding path FP and the document feeder 35 has each of the upstream-side unit 59 and the downstream-side unit 60 which are upstream and downstream of the reading unit 52 in the document feeding path FP. By adopting this configuration, by opening the upstream-side unit 59 and the downstream-side unit 60 that are upstream and downstream of the reading unit 52, in that position, it becomes easy to remove a document that has become jammed.

Further, the invention is not limited to the above-described embodiment and may be modified in the following manner.

(9) Because the supply roller pairs 73 become worn with age due to documents being interposed therebetween and due to rotation, supposing the protruding portions 67 do not exist, by trying to meet the requirement of the accuracy of clearance for allowing a document to pass through the document feeding path by making the supply roller pairs 73 come in contact, the clearance might decrease over time. However, by making the protruding portions 67 come in contact with the guide surface 61 of the mechanism body unit 58, the mechanism body unit 58 of the upstream-side unit 59 is positioned, regardless of wear of the supply roller pairs 73, and it is possible to maintain over time the accuracy of clearance for allowing a document to pass through the document feeding path.

In the above-described embodiment, instead of providing the unit body 63 with the protruding portions 67, protruding portions that protrude toward the guide surface 65 of the unit body 63 on both sides of a document in the width direction outside the feeding portion that forms the document feeding path FP may be provided in the mechanism body unit 58. By adopting this configuration, it is possible to position the unit body 63 that is movable with respect to the mechanism body unit 58 by making the protruding portions come in contact with the surface that forms the document feeding path FP of the unit body 63 by using the protruding portions.

In the above-described embodiment, instead of providing the unit body 83 with the protruding portions 87, in the mechanism body unit 58, protruding portions that protrude toward the guide surface 85 of the unit body 83 on both sides of a document in the width direction outside the feeding portion that forms the document feeding path FP may be provided. By adopting this configuration, the mechanism body unit 58 of the unit body 83 that is movably provided can be positioned by making the protruding portions come in contact with the surface that forms the document feeding path FP of the unit body 83.

In the above-described embodiment, the upstream-side unit 59 and the downstream-side unit 60 are freely rotatable about the supporting shafts 64 and 84; however, at least one unit of the upstream-side unit 59 and the downstream-side unit 60 may be arranged so as to be capable of freely sliding to/away from the mechanism body unit 58. In this case, it is preferable to form protruding portions that protrude toward the surface that forms the document feeding path so as to come in contact with the surface forming the document feeding path in any one unit of the other unit among the unit that is arranged freely slidably and the mechanism body unit 58.

In this embodiment, the mechanism body unit 58 is fixed to the mechanism unit case 55; however, in the fixing of the mechanism unit case 55 of the mechanism body unit 58, the upstream-side unit 59 and the downstream-side unit 60 are preferably fixed at the stage of assembly.

In the above-described embodiment, the supporting shafts 64 are provided in the upstream-side portions of the end surfaces 63a of the unit body 63 in the feeding direction, and the downstream-side portion of the unit body 63 in the feeding direction is made freely rockable. Instead of this configuration, the supporting shafts 64 may be provided in downstream-side portions of the end surfaces 63a of the unit body 63 in the feeding direction and the upstream-side portion of the unit body 63 in the feeding direction may be made freely rockable. In this case, the protruding portions 67 will be provided to the upstream-side portions of the end surfaces 63a. In this way, because the protruding portions 67 are positioned far away from the supporting shafts 64 (pivot), it is possible to increase the accuracy of clearance for allowing the document to pass through the document feeding path.

In this embodiment, in the downstream-side portion of each of the end surfaces 63a of the unit body 63 in the feeding direction, the locking members 66 are provided and the protruding portions 67 are integrally arranged in parallel with the locking members 66 on the side opposite to the guide surface 65. Instead of this configuration, in the downstream-side portion of each of the end surfaces 63a of the unit body 63 in the feeding direction the protruding portions 67 may be provided and the locking members 66 may be integrally arranged in parallel with the protruding portions 67 on the side opposite to the guide surface 65.

In the above-described embodiment, the cover member 69 that covers a surface (in FIG. 8, a lower surface) of the locking members 66 on the side opposite to the guide surface 65 is formed integrally with the end surfaces 63a of the unit body 63 at the downstream side in the feeding direction A; however, they may be formed separately.

Examples of the urging member include a torsion spring, a pulling spring, a board spring and the like, but are not limited to these.

In this embodiment, in the unit body 63, the protruding portions 67 are on both sides of a document in the width direction outside the feeding portion that forms a portion of the document feeding path FP and are provided at positions that overlap the locking members 66 in the main scanning direction Y; however, they may be provided at positions that do not overlap the locking members 66 in the main scanning direction Y.

In the above-described embodiment, regarding the locking members 66, the side surfaces 66a that face the document passing along the guide surface 65 have a shape that tapers toward the inside of the feeding portion that forms a portion of the document feeding path FP and toward the downstream side in the feeding direction A; however, they need not have a tapered shape.

In the above-described embodiment, the cover member 69 is provided; however, the cover member 69 may be omitted.

In the above-described embodiment, the protruding portions 67 and 87 are provided on both the upstream-side unit 59 and the downstream-side unit 60; however, either of the protruding portions may be omitted, and the other may be formed as above.

The entire disclosure of Japanese Patent Application No.:2015-039255, filed Feb. 27, 2015 is expressly incorporated by reference herein.

What is claimed is:

1. An automatic document feeder comprising:
    a first unit that has a first surface that forms a document feeding path and that is provided so as to be movable,
    a second unit that has a second surface that together with the first surface forms the document feeding path, the second surface being capable of opposing the first surface, and
    protruding portions that are formed on the first unit on both sides of a width direction of a document outside of a feeding portion forming the document feeding path and that protrude toward a surface of the second unit, the surface forming the document feeding path, and
    a gap is formed between the first surface and the second surface by making the protruding portions come in contact with the surface of the second unit,
    wherein the first unit has urging members that urge the first unit in the direction of the movement,
    the urging members are torsion springs, the torsion springs having a winding portion that is wound around the pivot,
    first locking portions that lock one end of the torsion springs are provided to the protruding portions,
    second locking portions that lock the other end of the torsion springs are provided in the second unit.

2. The automatic document feeder according to claim 1, wherein the first unit has a pivot that rotates in a rotation direction that is a direction of the movement, the pivot being provided in one portion among an upstream-side portion and a downstream-side portion of the first unit in the feeding direction of the document feeding path, and
    the protruding portions are provided in the other portion among the upstream-side portion and the downstream-side portion of the first unit in the feeding direction of the document feeding path.

3. The automatic document feeder according to claim 1, wherein the first locking portions and the protruding portions are provided at positions that overlap in the width direction of the document.

4. The automatic document feeder according to claim 3, wherein the first locking portions are provided at positions adjacent to end portions of the first surface in the width direction.

5. The automatic document feeder according to claim 4, wherein a side of the first locking portions that faces the document that passes the first surface has a shape that tapers toward the downstream side in the feeding direction and toward the inside of the feeding portion.

6. The automatic document feeder according to claim 5, wherein a cover member that covers the first locking portions is provided on a side of the first locking portions opposite to the first surface.

7. The automatic document feeder according to claim 6, wherein a reading unit that reads the document is provided in the document feeding path, and
    the first unit is provided on each of the upstream and downstream sides of the reading unit in the document feeding path.

* * * * *